United States Patent [19]
Lutz et al.

[11] Patent Number: 4,735,305
[45] Date of Patent: Apr. 5, 1988

[54] LOAD CARRYING APPARATUS CAPABLE OF MOVING IN BOTH A WALK MODE AND A CRAWL MODE

[76] Inventors: David E. Lutz; David W. Lutz, both of P.O. Box 810, Carlisle, Pa. 17013

[21] Appl. No.: 12,369

[22] Filed: Feb. 9, 1987

[51] Int. Cl.$^4$ .............................................. B65G 25/00
[52] U.S. Cl. .................................... 198/774; 414/399; 414/576
[58] Field of Search ............................ 198/774, 468.6; 414/750, 572, 576, 399, 391, 392

[56] References Cited

U.S. PATENT DOCUMENTS 4,219,113  8/1980  Fieser et al. .................... 198/774
4,411,586  10/1983  Zitser et al. .................... 414/750

FOREIGN PATENT DOCUMENTS

2840214  4/1979  Fed. Rep. of Germany ...... 414/572

Primary Examiner—Robert J. Spar
Assistant Examiner—Jennifer Doyle
Attorney, Agent, or Firm—Oblon, Fisher, Spivak, McClelland & Maier

[57] ABSTRACT

A load carrying apparatus designed to be very low relative to its length, to be capable of crawling under a string of loaded pallets in a crawl mode, to be capable of carrying the string of loaded pallets in a walk mode, and to be capable of moving a string of loaded pallets forward or backward relative to the apparatus. The apparatus includes (a) a track member, which during use of the apparatus, is moved across and in contact with a surface; (b) a load moving member carried by the track member; (c) a vertical drive mechanism for moving the load moving member vertically relative to the track member from a down position in which the load moving member is supported by the surface to a partly up position, from the partly up position to a fully up position in which, during use of the apparatus, the load moving member supports a load to be moved by the apparatus, from the fully up position to the partly up position, and from the partly up position to the down position; and (d) a horizontal drive mechanism for effecting relative horizontal movement of the track member and the load moving member when the load moving member is in either its partly up position or its fully up position.

12 Claims, 10 Drawing Sheets

LOAD CARRYING APPARATUS CAPABLE OF MOVING IN BOTH A WALK MODE AND A CRAWL MODE

FIELD OF THE INVENTION

The invention is a walker-crawler load carrying apparatus. It is particularly, but not exclusively, suitable for moving strings of palletized loads back and forth between a loading dock and the interiors of trucks backed up against the loading dock.

BACKGROUND OF THE INVENTION

The subject invention is an improvement on the invention disclosed and claimed in commonly owned U.S. Pat. No. 3,767,064, issued Oct. 23, 1973, to David Edward Lutz and entitled "Traveling Walking Beam Conveyor." Apparatuses of this type are used, for example, to move strings of palletized loads into and out of the backs of trucks or trailers from and to a loading dock. Since the standard height of the space under pallets is only four inches, and since the strings of pallets that such apparatuses move may be many feet long, such apparatuses must be extremely low relative to their lengths. Additionally, since the pallets are often heavily loaded and since the apparatuses must be capable of carrying several (e.g., eight) such pallets in such a string, such apparatuses must be extremely sturdy. Moreover, since such apparatuses have to be capable both of moving under a string of palletized loads without moving the pallet and of carrying the pallets, such apparatuses have to be capable of moving in both of two different modes (referred to herein as "the crawl mode" and "the walk mode").

Although not essential to such apparatuses, it is highly desirable that they be capable of indexing a string of pallets forward as each successive pallet is removed, one-at-a-time from the front end of the apparatus. Similarly, although not essential to such apparatuses, it is highly desirable that they be capable of moving laterally and of pivoting about either end in order to compensate for inadvertent cocking taking place during normal use.

SUMMARY OF THE INVENTION

The apparatus according to the invention comprises (a) a track member which, during use of the apparatus, is moved across and in contact with a surface; (b) a load moving member carried by the track member; (c) vertical driving means for moving the load moving member vertically relative to the track member from a down position in which the load moving member is supported by the surface to a partly up position, from the partly up position to a fully up position in which, during use of the apparatus, the load moving member supports a load to be moved by the apparatus, from the fully up position to the partly up position, and from the partly up position to the down position; and (d) horizontal drive means for effecting relative horizontal movement of the track member and the load moving member when the load moving member is in either its partly up position or in its fully up position.

DETAILED DESCRIPTION OF THE PRESENTLY PREFERRED EMBODIMENTS

The First Embodiment

Figure 1:
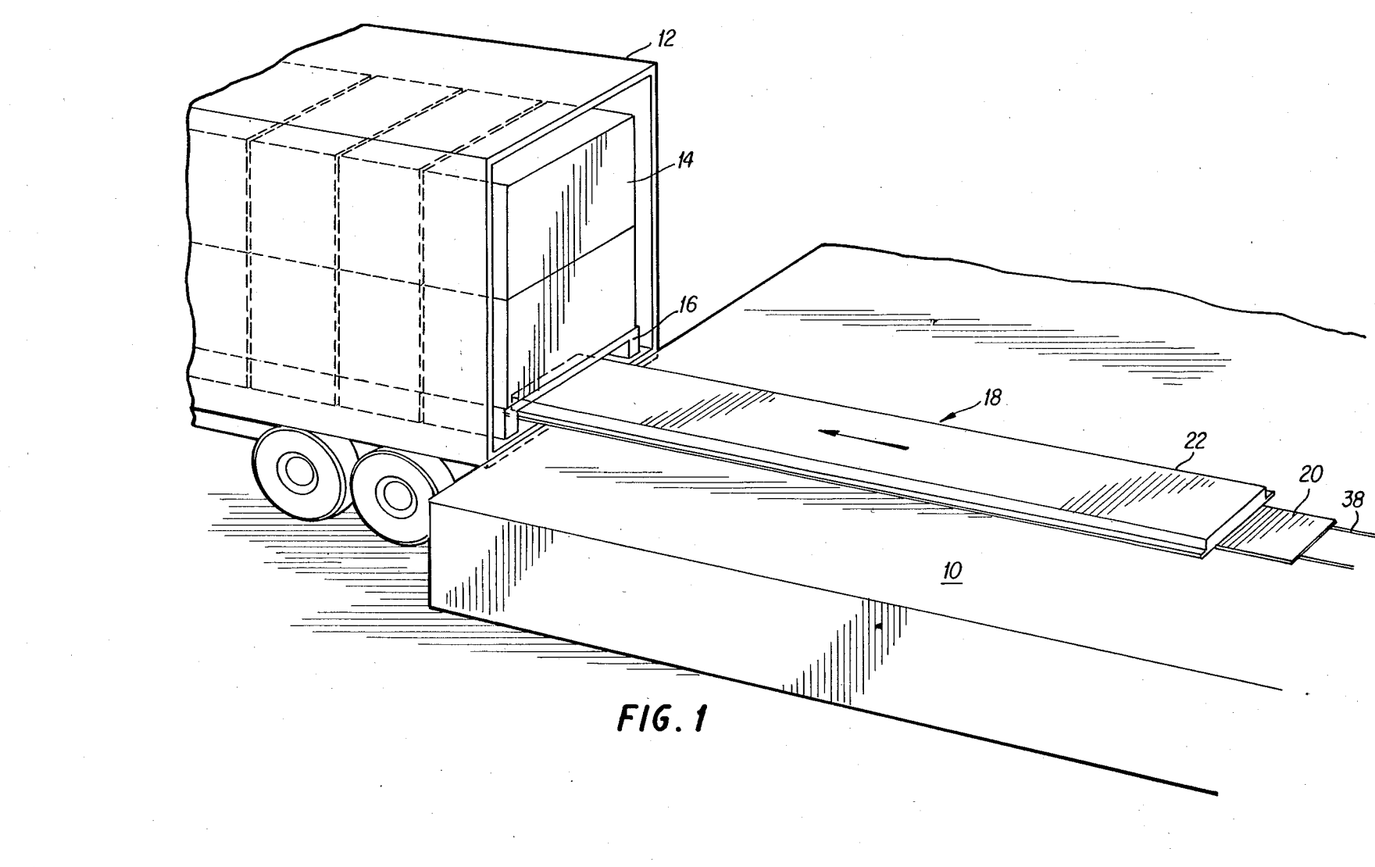
FIG. 1 is a perspective view of a first embodiment of the invention in use.

FIG. 1 shows a first embodiment of the invention in an environment for which it is particularly well suited—namely, transferring a large number of palletized loads back and forth between a loading dock 10 and the interior of a truck 12. In FIG. 1, a large number of containers 14 are disposed on pallets 16 in the back of the truck 12, and a walker-crawler 18 according to the invention is to be used to transfer the containers 14 and the pallets 16 from the back of the truck 12 onto the dock 10.

FIGS. 2-11 show the longitudinal movements of the walker-crawler 18 in both its walking and its crawling modes. The walker-crawler 18 comprises a track member 20, a load moving member 22, horizontal drive means 24, and vertical drive means 26 (not shown in FIGS. 2-11). In the presently preferred embodiment illustrated in FIGS. 2-11, the horizontal drive means 24 comprises two fluidic (hydraulic or pneumatic) jacks 28 operating in tandem. One end of each fluidic jack 28 is pivotally mounted on a lug 30 depending from and axially centrally located on the load moving member 22, and the other end of each fluidic jack 28 is pivotally mounted on a lug 32 upstanding from and axially centrally located on the track member 20. However, the term "horizontal drive means" is specifically intended to encompass other types of drive means, including non-axially located fluidic jacks and other types of motors (including electro-magnetic and electro-mechanical motors) capable of effecting the required relative horizontal movements of the track member 20 and the load moving member 22. Moreover, while leftward and rightward movement of the walker-crawler 18 is effected in the preferred embodiment by the use of fluidic jacks 28 having three positions (namely, a contracted position, a half extended position, and a fully extended position), it is also within the contemplation of this invention to use opposing fluidic jacks, each one or set of which effects movement of the walker-crawler 18 in only one direction.

The horizontal movements of the walker-crawler 18 will now be explained with reference to FIGS. 2-11. FIGS. 2-6 illustrate movement to the right, and FIGS. 7-11 illustrate movement to the left.

Figure 2:
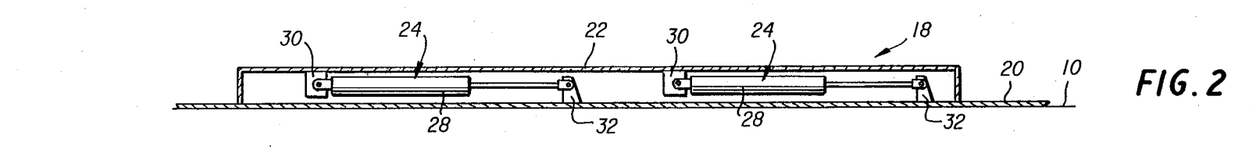
FIGS. 2-6 are cross-sectional views illustrating rightward movement of the first embodiment.

FIG. 2 shows the walker-crawler 18 in its central down position with its track member 20 extending both to the right and to the left relative to its load moving member 22 and its fluidic jacks 28 extended half way.

Figure 3:
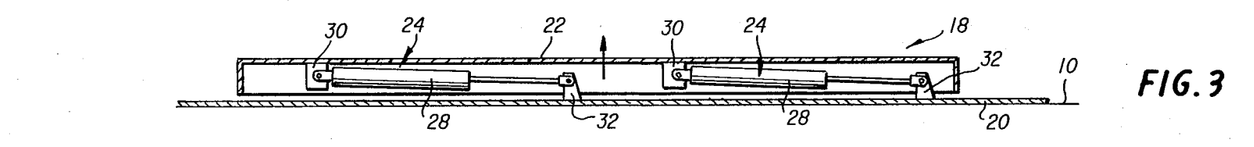

FIG. 3 shows the walker-crawler 18 in either one of its up positions (i.e., either in its walk position or in its crawl position). The vertical movement of the load moving member 22 has been accomplished by the vertical drive means 26, which is not shown in FIGS. 2-11, and the fluidic jacks 28 have not been involved in this movement except to the minor extent that the vertical movement of the load moving member 22 has caused the fluidic jacks 28 to extend to accommodate the increased distance between the lugs 30 and the lugs 32. The track member 20 remains extended in both directions relative to the load moving member 22, but neither the track member 20 nor the load moving member 22 has yet moved horizontally.

Figure 4:
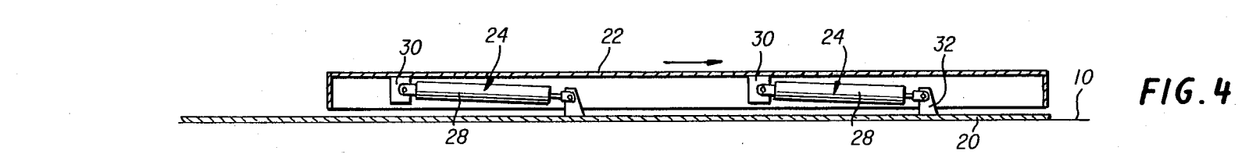

FIG. 4 shows the effect of contraction of the fluidic jacks 28. Since the weight of the load moving member 22 is transmitted through the lugs 30, the fluidic jacks 28, and the lugs 32 to the track member 20, and since the load moving member 22 is not anchored in any way, contraction of the fluidic jacks 28 causes the load moving member 22 to move to the right by one increment (the increment being just slightly less than half the stroke length of the fluidic jacks 28). During this movement, the fluidic jacks 28 pivot slightly to accommodate the relative horizontal motion of the track member 20 and the load moving member 22, but the vertical drive means 26 is not involved in the movement. Once the load moving member 22 has moved to the right, the track member 20 extends to the left of the load moving member 28 by approximately twice the increment of movement of the walker-crawler 18.

Figure 5:
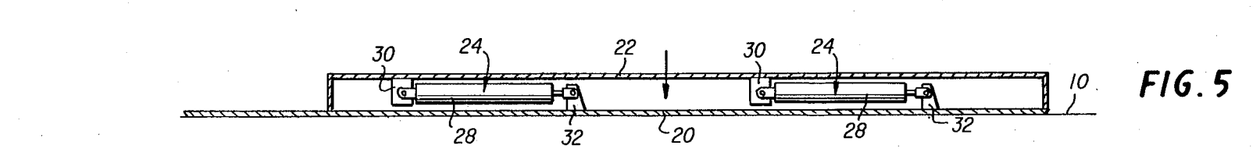
Figure 12A:
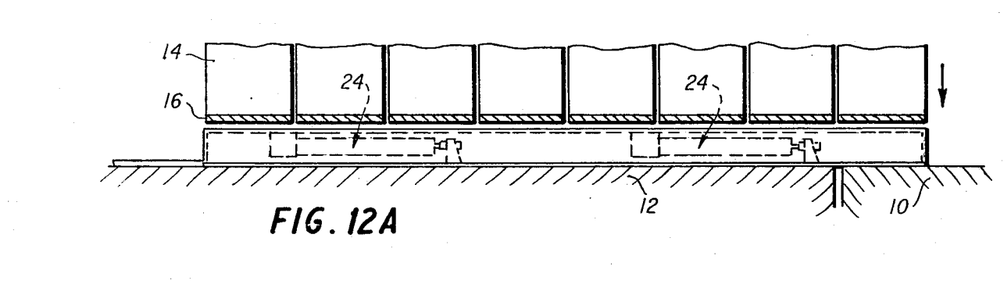
FIGS. 12A, 12B, 13A, 13B, 14A, 14B, 15A, 15B, 16A, 16B, 17A, 17B are cross-sectional views illustrating vertical movement of the first embodiment.
Figure 12B:
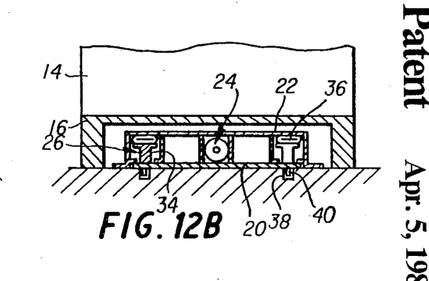
Figure 13A:
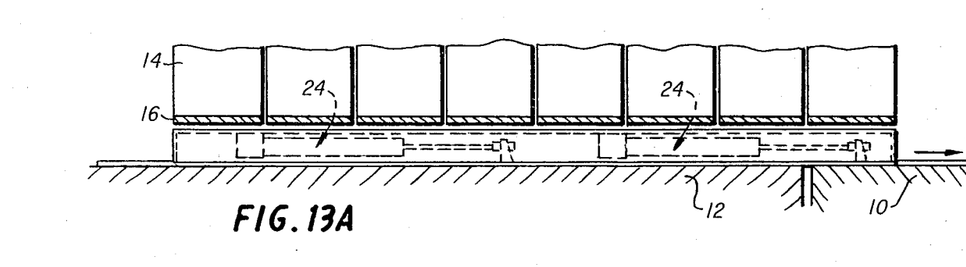
Figure 13B:
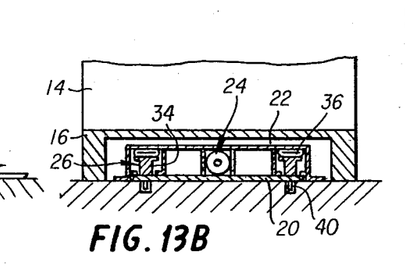
Figure 14A:
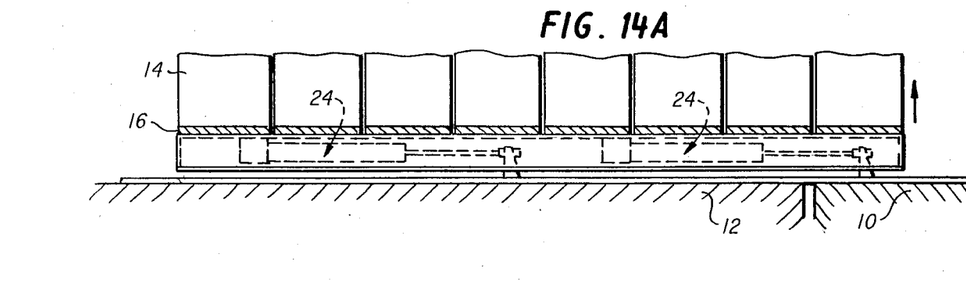
Figure 14B:
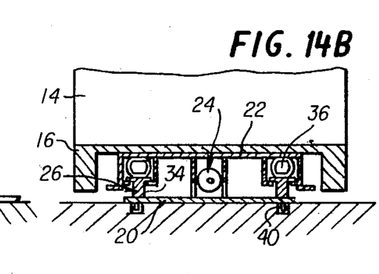
Figure 15A:
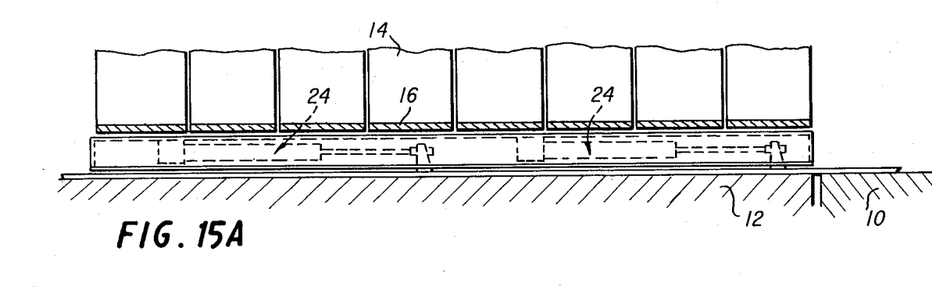
Figure 15B:
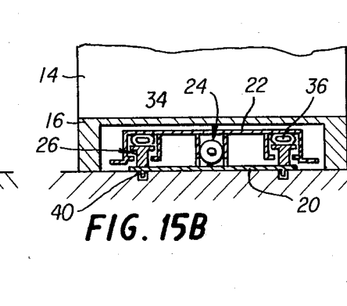
Figure 16A:
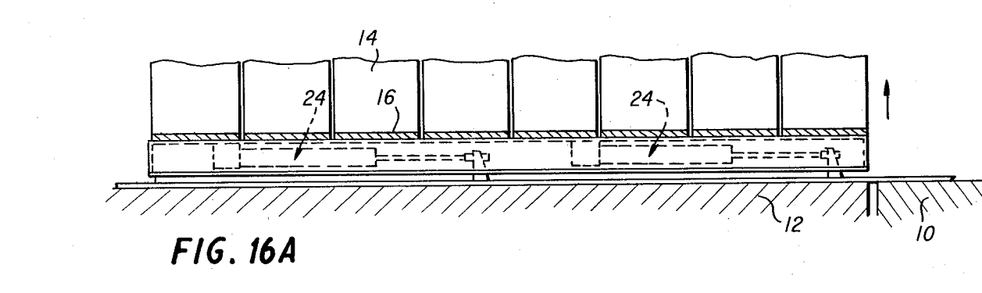
Figure 16B:
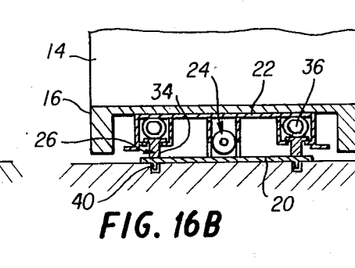

FIG. 5 shows the effect of downward movement of the vertical drive means 26. The load moving member 22 has returned to its down position, in which (as shown in FIG. 12B) the load moving member 22 is supported on the surface (in this case the surface of the loading dock 10) supporting the walker-crawler 18. Once again, the fluidic jacks 28 have not been involved in the vertical movement except to the minor extent that the vertical movement of the load moving member 22 has caused the fluidic jacks 28 to contract to accommodate the decreased distance between the lugs 30 and the lugs 32. The track member 20 continues to extend to the left of the load moving member 22 by approximately two increments.

Figure 6:
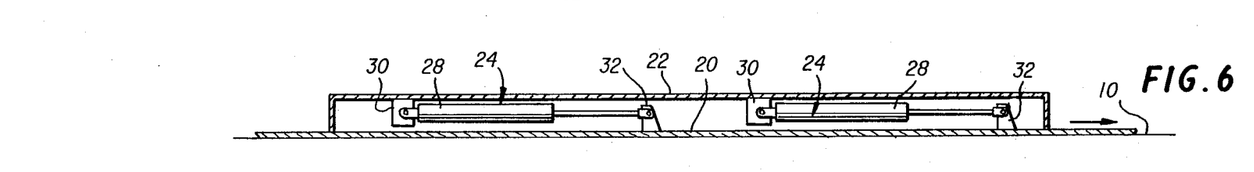

FIG. 6 shows the effect of extending the fluidic jacks 28 from their contracted to their half extended positions with the load moving member 22 in its down position. In this position, the load moving member 22 is resting on the loading dock 10 (or other support surface). Since the load moving member 22 is heavier than the track member 20, when the fluidic jacks 28 are extended half way, the load moving member 22 remains stationary and the track member 20 moves to the right by one increment (the increment being equal to the increment shown in FIG. 4—that is to say, just slightly less than half the stroke length of the fluidic jacks 28).

It should be appreciated that, at the point shown in FIG. 6, the components of the walker-crawler 18 have returned to the position shown in FIG. 2, but the walker-crawler 18 has moved to the right by one increment. Moreover it should be appreciated (1) that the same horizontal movement will have been accomplished whether the up position of the load moving member 22 is the fully up "walk" position or the partly up "crawl" position and (2) that the same horizontal movement will have been accomplished whether or not the load moving member 22 is carrying a load, since the sine qua non of movement is that the load moving member 22 be heavier than the track member 20 (or, at least, that the force of static friction holding the load moving member 22 in position be greater than the force of static friction holding the track member 20 in position), and the amount by which the load moving member 22 is heavier than the track member 20 only increases when the load moving member 22 is carrying a load.

Figure 7:
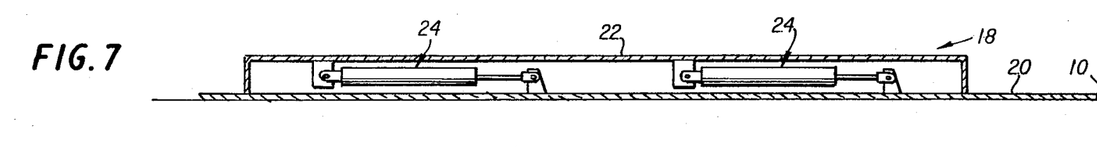
FIGS. 7-11 are cross-sectional views illustrating leftward movement of the first embodiment.

FIG. 7 is identical to FIG. 2. That is, it shows the walker-crawler 18 in its central down position with its track member 20 extending both to the right and to the left relative to its load moving member 22 and its fluidic jacks 28 extending half way.

Figure 8:
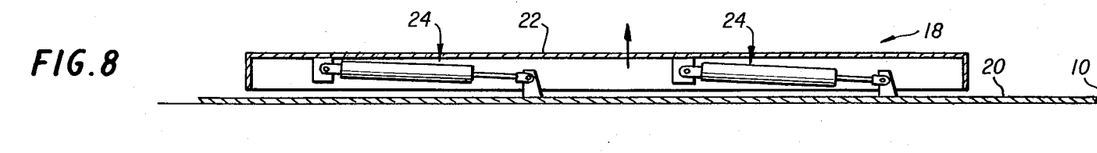

FIG. 8 is similarly identical to FIG. 3, showing the walker-crawler 18 in either one of its up positions.

Figure 9:
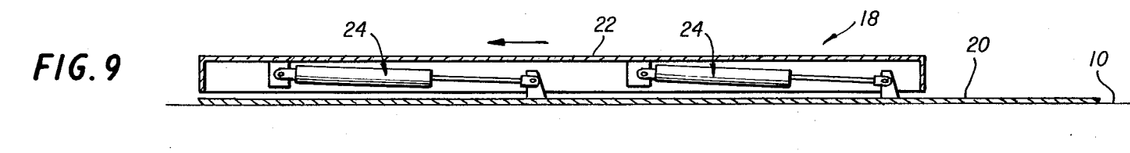

FIG. 9 shows the effect of extending the fluidic jacks 28 fully. Once again, since the weight of the load moving member 22 is transmitted to the track member 20, and since the load moving member 22 is not anchored in any way, the movement of the fluidic jacks 28 causes the load moving member 22 to move—this time to the left by one increment. During this movement, the fluidic jacks 28 pivot slightly to accommodate the relative horizontal motion of the track member 20 and the load moving member 22, but the vertical drive means 26 is not involved in the movement. Also, once the load moving member 22 is moved to the left, the track member 20 extends to the right of the load moving member 22 by approximately twice the increment of movement of the walker-crawler 18.

Figure 10:
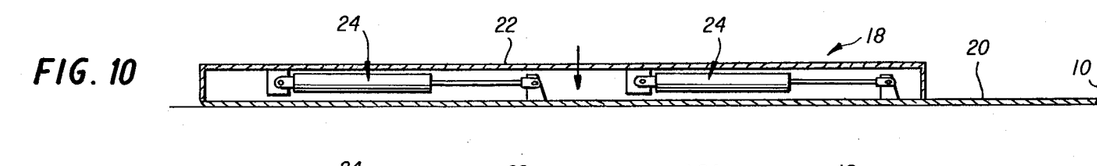

FIG. 10 shows the effect of downward movement of the vertical drive means 26. The load moving member 22 has returned to its down position, in which the load moving member 22 is supported on the surface supporting the walker-crawler 18. Once again, the fluidic jacks 28 have not been involved in the vertical movement except to the minor extent that the vertical movement of the load moving member 22 has caused the fluidic jacks 28 to contract to accommodate the decreased distance between the lugs 30 and the lugs 32. The track member 20 continues to extend to the right of the load moving member 22 by approximately two increments.

Figure 11:
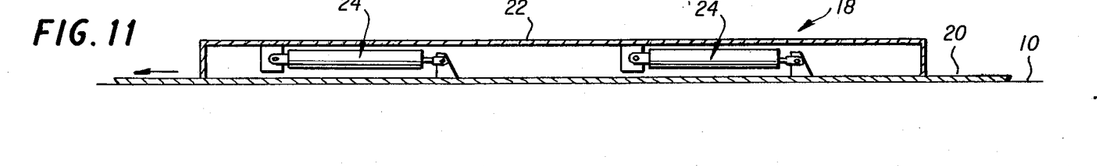

FIG. 11 shows the effect of contracting the fluidic jacks 28 from their fully extended to their half extended positions with the load moving member 22 in its down position. In this position, the load moving member 22 is resting on the loading dock 10 (or other support surface). Since the load moving member 22 is heavier than the track member 20, when the fluidic jacks 28 are contracted from their fully extended to their half-extended positions, the load-moving member 22 remains stationary and the track member 20 moves to the left by one increment.

It should be apparent that, at the point shown in FIG. 11, the components of the walker-crawler 18 have returned to the position shown in FIG. 7, but the walker-crawler 18 is moved to the left by one increment. Moreover, once again the movement of the walker-crawler 18 has been independent both of whether the up position of the load moving member 22 is the fully up "walk" position or the partly up "crawl" position and of whether or not the load moving member 22 is carrying a load.

The reader's attention is now invited to FIGS. 12-17, which illustrate the vertical movements of the walker-crawler 18 in both its walking and its crawling modes. As illustrated therein, the vertical drive means 26 preferably comprises a plurality of vertical drive means of the type described in commonly owned U.S. patent application Ser. No. 646,053, filed Aug. 31, 1984, and entitled "A Fluid-Operated, Low Profile Reciprocating Conveyor." The disclosure of that application is hereby incorporated herein by reference. However, for the convenience of the reader, that drive mechanism is also briefly described herein.

Figure 17A:
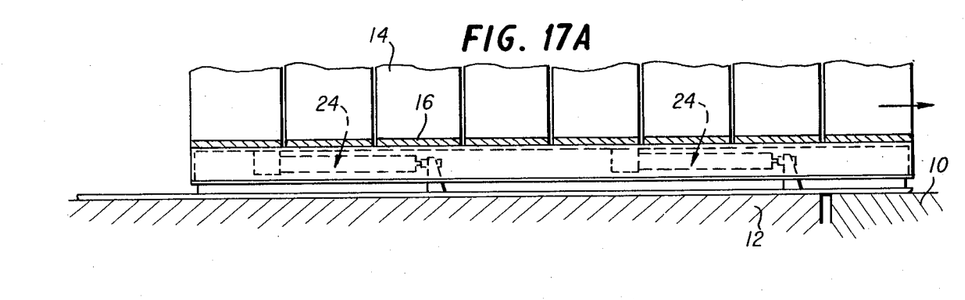
Figure 17B:
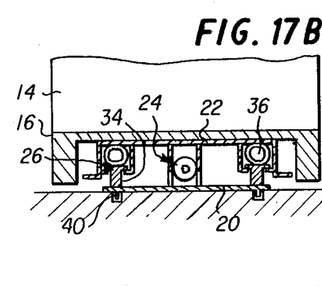

The vertical drive means 26 illustrated in FIGS. 12B-17B comprises two distancing rails 34 upstanding from the track member 20 and a fluidically (preferably pneumatically) inflatable hose 36 disposed between the top of each distancing rail 34 and the bottom of the load moving member 22. When the hoses 36 are fully deflated (as shown in FIGS. 12B and 13B), the load moving member 22 is in its down position; when the hoses 36 are partly inflated (as shown in FIG. 15B), the load moving member 22 is in its partly up (or "crawl") position; and, when the hoses 36 are fully inflated (as shown in FIGS. 14B, 16B, and 17B), the load moving member 22 is in its fully up (or "walk") position.

Although FIGS. 12B-17B show the use of two-stage vertical drive mechanisms (i.e., hoses which are inflatable to two different extents), it is also specifically within the contemplation of this invention to use two different sized hoses, each of which is used in only a deflated and a fully inflated condition. In an embodiment employing this construction, the fully inflated condition of the hoses having the smaller diameter would define the crawl height of the load moving member 22, and the fully inflated condition of the hoses having the larger diameter would define the walking height of the load moving member 22.

FIGS. 12B-17B also show means for preventing lateral movement of the walker-crawler 18 as it moves longitudinally. Although such means could take on many forms, in the illustrated embodiment they comprise two parallel, longitudinally extending channels 38 in the surfaces (e.g., the loading dock 10 and/or the bed of the truck 12) over which the walker-crawler 18 moves, a plurality of vertically depending lugs 40 mounted in two parallel, longitudinal lines on the bottom of the track member 20 and sized, shaped, and positioned to extend into a corresponding one of the channels 38, and a guide wheel 42 rotatable about a vertical axis mounted on the bottom of each lug 40. As will be apparent, the width of the channels 38 may be widened where the dock 10 and the bed of the truck 12 meet to accommodate axial misalignments of the truck 12.

The reader's attention is next invited to FIGS. 18-21, which illustrate the way in which the walker-crawler 18 can be unloaded, one pallet at a time from the front end. Although not essential to the operation of the walker-crawler 18, this is a particularly advantageous feature of the invention.

Figure 18:
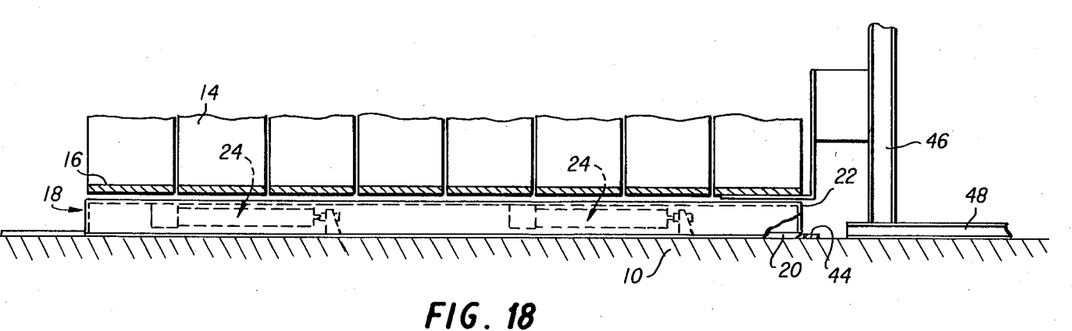
FIGS. 18-21 are partly sectional views illustrating forward indexing of a string of pallets as each successive forwardmost pallet is removed by a fork lift truck.

FIG. 18 shows the walker-crawler 18 in an extreme rightward position defined by contact of the track member 20 with a stop member 44 fixedly mounted on the loading dock 10. Eight pallets 16, each carrying one or more containers 14, are carried by the load moving member 22. With the load moving member 22 in its fully down or half-up position, a fork-lift truck 46 mounted on a track 48 can remove the forwardmost pallet 16 and the container(s) carried thereby, leaving a vacant space at the right end of the load moving member 22.

Figure 19:
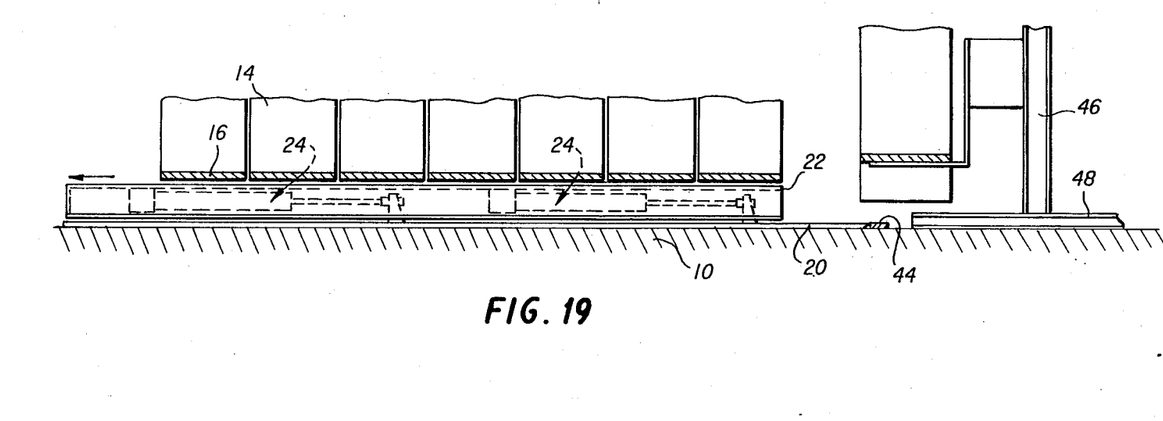

FIG. 19 shows the effect of extension of fluidic jacks 28 from their contracted to their half-extended positions with the load moving member 22 in its half-up, or "crawl" position. Since forward movement of the track member 20 is prevented by the stop member 44, the load moving member 22 moves to the left by one increment, bringing the front end of the load moving member under what was formerly the number 2 pallet 16. Since the walker-crawler 18 is in its crawl mode, the movement of the walker-crawler 18 does not effect the position of the pallets 16.

Figure 20:
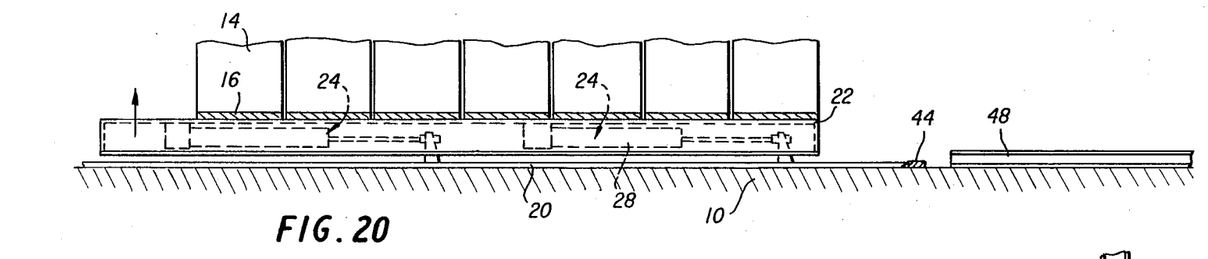

Next, as shown in FIG. 20, the vertical drive means 26 is actuated, bringing the load moving member 22 to its fully up position, thereby lifting all the remaining pallets 16 off the loading dock 10.

Figure 21:
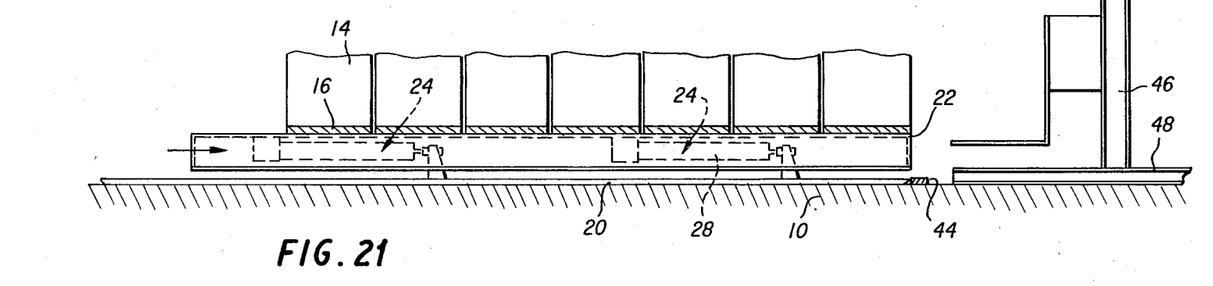
Figure 22:
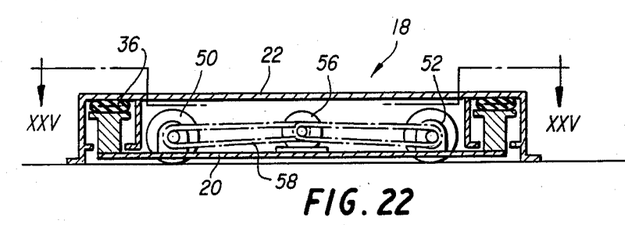
FIG. 22 is a cross-sectional view on the line XXII—XXII in FIG. 25 of a second embodiment of the invention in its down position.
Figure 23:
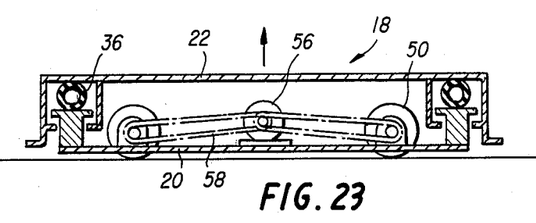
FIG. 23 is a cross-sectional view of the second embodiment of the invention in its fully up position.
Figure 24:
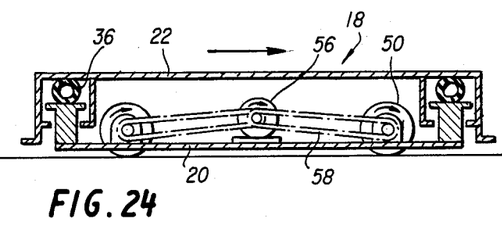
FIG. 24 is another cross-sectional view of the second embodiment of the invention in its fully up position illustrating rightward lateral movement.
Figure 25:
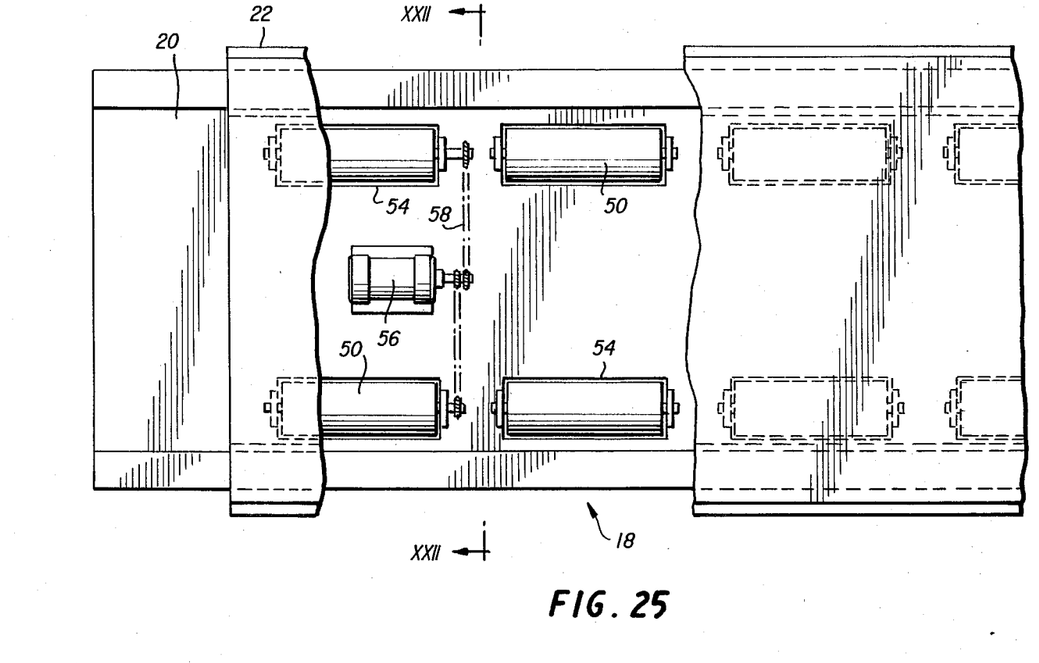
FIG. 25 is a partially sectional view along the line XXV—XXV in FIG. 22.

Next, as shown in FIG. 21, contraction of the fluidic jacks 28 while the load moving member 22 remains in its fully up position brings the remaining seven pallets to the right by one increment, leaving the vacant space at the left-hand end of the string of pallets 16. The load moving member 22 is then dropped to its half up or fully down position, the fork lift truck 46 removes the number two pallet 16 and its load, and the indexing procedure is repeated until the walker-crawler 18 has been unloaded.

It will, of course, be appreciated that incremental loading of the walker-crawler 18 with the fork lift truck 46 is simply the reverse of the unloading operation described above.

A loaded walker-crawler 18 is walked into the back of a truck 12 in the fashion described above. Once the load is in the truck 12, the direction of the walker-crawler 18 is reversed, and the vertical movements of the walker-crawler 18 are switched from its walking mode to its crawl mode. This leaves the load in the truck 12 and permits the walker-crawler 18 to crawl out of the truck 12, leaving the load behind.

On the other hand, if it is desired to unload a truck 12 containing a pallet string, the walker-crawler 18 is crawled into the back of the truck 12 with the vertical movements of the walker-crawler 18 in its crawl mode. Once the walker-crawler 18 is in the truck 12 and under the load, the direction of the walker-crawler 18 is reversed, the vertical movements of the walker-crawler 18 are switched from its crawl mode to its walk mode, and the load is brought out of the back of the truck 12.

Since the fluidic (pneumatic or hydraulic) circuitry for controlling the horizontal drive means 24 and the vertical drive means 26 are conventional, they will not be described herein. It is obvious that the various fluidic lines would normally be connected to a control unit mounted on the loading dock 10. However, it would also be possible to control the walker-crawler 18 from a control unit mounted in or on the truck 12 (i.e., to design the walker-crawler 18 to be portable with the truck 12 rather than as confined to the loading dock 10).

The Second Embodiment

The reader's attention is now invited to FIGS. 22-25, which show a second embodiment of the subject invention. In these figures, parts which are the same as the corresponding parts in the first embodiment have been given the same parts numbers and will not be described again. Also, it should be noted that the horizontal drive means 24 is not shown in FIGS. 22-25, since its depiction is unnecessary for an understanding of the differences between the first and second embodiments.

In the second embodiment, the track member 20 does not bear directly against the supporting surfaces. Instead, at least two longitudinal rows of rollers 50 are mounted on the track member 20, and it is the rollers 50 that bear directly against the supporting surfaces. Each roller 50 is journalled in bearings 52 mounted on the top of the track member 20, and each roller 50 projects through a corresponding rectangular hole 54 in the track member 20. The axes of the rollers 50 are parallel to the walk-crawl direction of the walker-crawler 18, so that the normal walking or crawling motion of the walker-crawler 18 is accomplished by dragging the rollers 50 along lines of contact parallel both to their axes and to the walk-crawl direction.

Most of the rollers 50 are unpowered. However, at least one roller 50 (and preferably one pair of rollers 50) at each end of the walker-crawler 18 is powered. To accomplish this, a motor 56 is mounted on the track member 20 adjacent to the roller(s) 50 to be powered. The motor 56 is connected to each roller 50 to be powered by a drive chain 58. Thus, if it is desired to move the walker-crawler 18 laterally (for example, to service an adjacent truck bay), the powered roller(s) 50 at both ends of the track member 20 are driven simultaneously in the same direction. Similarly, if it is desired to vary the walk-crawl direction (for example, to compensate for inadvertent cocking during repeated uses of the walker-crawler 18 or to compensate for the mispositioning of a truck into which the walker-crawler 18 is to enter), either the powered roller(s) 50 at only one end of the track member 20 are driven or the powered roller(s) 50 at both ends of the track member 20 are driven simultaneously in opposite directions.

Additional Aligning Means

Figure 26:
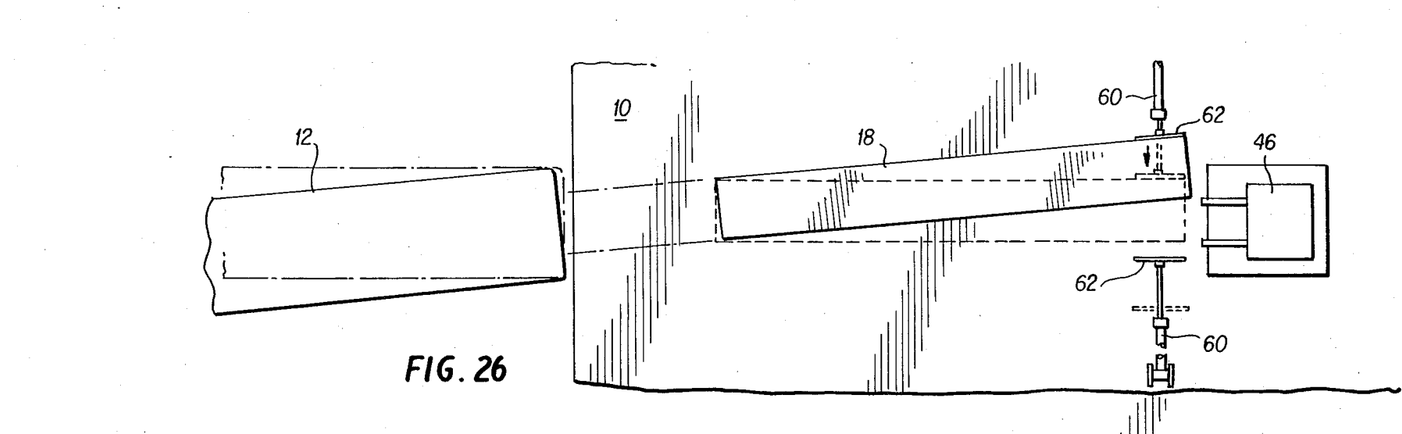
FIG. 26 is a plan view showing a first form of aligning means.
Figure 27:
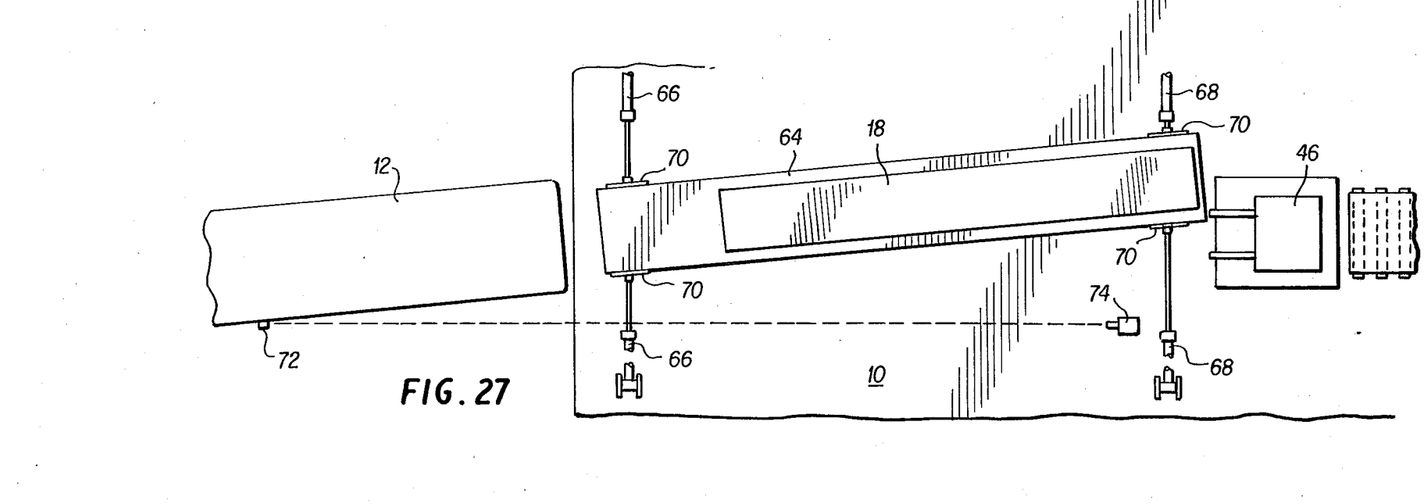
FIG. 27 is a plan view showing a second form of aligning means.

The reader's attention is now invited to FIGS. 26 and 27, which show two forms of aligning means that can be used with or form a part of the invention. In these figures, parts which are the same as the corresponding parts in the first two embodiments have been given the same parts number and will not be described again.

Since the walker-crawler 18 moves in a straight line in normal use, when a truck 12 is parked significantly out of perpendicular alignment with regard to the loading dock 10, it is necessary either to repark the truck 12 or to reorient the walker-crawler 18. As previously disclosed, the second embodiment of this invention can be used to translate the walker-crawler 18 laterally and/or to reorient it angularly. However, two additional forms of aligning means are shown in FIGS. 26 and 27.

In the form shown in FIG. 26, the walker-crawler 18 has rollers 50 mounted on the track member 20 as shown in FIGS. 22-25. In this embodiment, angularly reorienting of the walker-crawler 18 is achieved by the provision of a pair of opposing fluidic jacks 60 mounted on the loading dock 10 near the proximal end of the walker-crawler 18 when it is close to the edge of the loading dock 10. A push bar 62 is pivotally mounted on each fluidic jack 60 so that appropriate extension and contraction of the two fluidic jacks 60 in position to bear directly against the walker-crawler 18 can be used to pivot the walker-crawler 18 around its at least approximately stationary distal end.

In the forms shown in FIG. 27, which is particularly suitable for use with unusually heavy loads, the walker-crawler 18 is borne by a flat steel plate 64 when the walker-crawler 18 is close to the edge of the loading dock 10. Angular reorienting of the walker-crawler 18 is achieved by the provision of a first pair of opposing fluidic jacks 66 mounted on the loading dock 10 near the distal end of the flat steel plate 64 and a second pair of opposing fluidic jacks 68 mounted on the loading dock 10 near the proximal end of the flat steel plate 10. A push bar 70 is pivotally mounted on each of the fluidic jacks 66, 68 and positioned to bear against the flat steel plate 64 so that appropriate extension and contraction of the four fluidic jacks 66, 68 can be used to reorient the flat steel plate 64, and thus the walker-crawler 18. A sensor element 72 mounted on the truck 12 and a corresponding sensor element 74 mounted in fixed position on the loading dock 10 can be used to control the amount of angular reorienting achieved by the fluidic jacks 66, 68.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A load carrying apparatus comprising:
   (a) a track member which, during use of the apparatus, is moved across a surface;
   (b) a load moving member carried by said track member;
   (c) vertical drive means for moving said load moving member vertically relative to said track member from a down position in which said load moving member is supported by the surface to a partly up position, from the partly up position to a fully up position in which, during use of the apparatus, said load moving member supports a load to be moved by the apparatus, from the fully up position to the partly up position, and from the partly up position to the down position; and
   (d) horizontal drive means for effecting relative horizontal movement of said track member and said load moving member when said load moving member is in either its partly up position or its fully up position.

2. A load carrying apparatus as recited in claim 1 wherein said horizontal drive means comprises at least one fluidic jack one end of which is pivotally mounted to said track member and one end of which is pivotally mounted to said load moving member.

3. A load carrying apparatus as recited in claim 2 wherein said at least one fluidic jack is selectively movable from a contracted position to a half extended position and from its half extended position to a fully extended position.

4. A load carrying apparatus as recited in claim 1 wherein said vertical drive means comprises at least one inflatable hose positioned between said track member and said load moving member.

5. A load carrying apparatus as recited in claim 4 wherein said at least one inflatable hose is selectively inflatable from a deflated position to a partly inflated position and from its partly inflated position to a fully inflated position.

6. A load carrying apparatus as recited in claim 1 and further comprising means for preventing inadvertent lateral movement of the apparatus.

7. A load carrying apparatus as recited in claim 6 wherein said means comprises:
 (a) at least two spaced lugs depending from the bottom surface of said track member and
 (b) a guide wheel rotatable about a vertical axis mounted on each of said at least two spaced lugs.

8. A load carrying apparatus as recited in claim 1 and further comprising at least two longitudinal rows of rollers mounted on the upper surface of said track member, the longitudinal axes of said rollers being at least substantially parallel to the walk-crawl direction of the load carrying apparatus, and each of said rollers projecting through a corresponding hole in said track member so that said rollers contact the surface.

9. A load carrying apparatus as recited in claim 8 and further comprising means for driving at least some of said rollers.

10. A load carrying apparatus as recited in claim 9 wherein said means are operatively connected to at least one of said rollers at each end of said track member.

11. A load carrying apparatus as recited in claim 10 wherein said means comprise a motor mounted on the upper surface of said track member at each end of said track member.

12. A load carrying apparatus as recited in claim 1 and further comprising means for angularly reorienting the load carrying apparatus.

* * * * *